United States Patent
Kwon et al.

(10) Patent No.: US 11,038,216 B2
(45) Date of Patent: Jun. 15, 2021

(54) WIRELESS BATTERY MANAGEMENT SYSTEM AND BATTERY PACK INCLUDING SAME

(71) Applicant: LG Chem, Ltd., Seoul (KR)

(72) Inventors: Jung-Hyun Kwon, Daejeon (KR); Chan-Ha Park, Daejeon (KR); Sang-Hoon Lee, Daejeon (KR); Yean-Sik Choi, Daejeon (KR)

(73) Assignee: LG Chem, Ltd.

( * ) Notice: Subject to any disclaimer, the term of this patent is extended or adjusted under 35 U.S.C. 154(b) by 232 days.

(21) Appl. No.: 16/341,210

(22) PCT Filed: Jun. 14, 2018

(86) PCT No.: PCT/KR2018/006718
§ 371 (c)(1),
(2) Date: Apr. 11, 2019

(87) PCT Pub. No.: WO2019/009531
PCT Pub. Date: Jan. 10, 2019

(65) Prior Publication Data
US 2019/0260097 A1 Aug. 22, 2019

(30) Foreign Application Priority Data

Jul. 6, 2017 (KR) .................. 10-2017-0085998

(51) Int. Cl.
*H01M 10/48* (2006.01)
*H02J 7/00* (2006.01)
(Continued)

(52) U.S. Cl.
CPC ........... *H01M 10/482* (2013.01); *B60L 50/50* (2019.02); *H02J 7/00* (2013.01); *H02J 7/0026* (2013.01);
(Continued)

(58) Field of Classification Search
CPC ......... H01M 10/482; H01M 2010/4271; H02J 7/0026; H02J 7/0004
(Continued)

(56) References Cited

U.S. PATENT DOCUMENTS 9,436,261 B2 9/2016 Yun
2009/0066291 A1 3/2009 Tien et al.
(Continued)

FOREIGN PATENT DOCUMENTS

EP 2202675 A1 6/2010
EP 2765643 A1 8/2014
(Continued)

OTHER PUBLICATIONS

International Search Report for PCT/KR2018/006718, dated Oct. 2, 2018.

(Continued)

*Primary Examiner* — Sun J Lin
(74) *Attorney, Agent, or Firm* — Lerner, David, Littenberg, Krumholz & Mentlik, LLP

(57) ABSTRACT

Disclosed herein are a wireless battery management system (BMS) and a battery pack including the same. The wireless BMS includes a plurality of slave BMSs installed and coupled to a plurality of battery modules of the battery pack in one-to-one correspondence, and a master BMS configured to wirelessly transmit a trigger signal to the plurality of slave BMSs for identification (ID) allocation to each of the plurality of slave BMSs. Each slave BMS is configured to generate a response signal including a respective allocated temporary ID in response to the trigger signal, and wirelessly transmit the response signal to the master BMS. For each given slave BMS, the master BMS is configured to receive the response signal from of the given slave BMS,
(Continued)

and determine a formal ID to be allocated to the given BMS based on a received signal strength of the response signal.

10 Claims, 6 Drawing Sheets

(51) Int. Cl.
    *B60L 50/50*              (2019.01)
    *H01M 10/42*            (2006.01)

(52) U.S. Cl.
    CPC . *H02J 7/00036* (2020.01); *H01M 2010/4271* (2013.01)

(58) Field of Classification Search
    USPC .......................................................... 320/134
    See application file for complete search history.

(56) References Cited

U.S. PATENT DOCUMENTS

| | | |
|---|---|---|
| 2010/0196748 A1 | 8/2010 | Ellwanger |
| 2011/0175574 A1 | 7/2011 | Sim et al. |
| 2013/0271072 A1 | 10/2013 | Lee et al. |
| 2014/0091769 A1 | 4/2014 | Kim et al. |
| 2014/0312913 A1 | 10/2014 | Kikuchi et al. |
| 2014/0354291 A1 | 12/2014 | Kikuchi et al. |
| 2015/0028816 A1* | 1/2015 | Lee ...................... H02J 7/0021 320/134 |
| 2015/0048779 A1 | 2/2015 | Lee |
| 2015/0084598 A1 | 3/2015 | Song |
| 2015/0139176 A1 | 5/2015 | Morita et al. |
| 2015/0244191 A1 | 8/2015 | Matsumura et al. |
| 2016/0020622 A1 | 1/2016 | Kwon et al. |

FOREIGN PATENT DOCUMENTS

| | | |
|---|---|---|
| JP | 2008199360 A | 8/2008 |
| JP | 2009064377 A | 3/2009 |
| JP | 2011097292 A | 5/2011 |
| JP | 2012222913 A | 11/2012 |
| JP | 2014078914 A | 5/2014 |
| JP | 2014103785 A | 6/2014 |
| JP | 2016012954 A | 1/2016 |
| JP | 2016021720 A | 2/2016 |
| JP | 2017192033 A | 10/2017 |
| KR | 20110013747 A | 2/2011 |
| KR | 20130053885 A | 5/2013 |
| KR | 101386080 B1 | 4/2014 |
| KR | 20140060801 A | 5/2014 |
| KR | 20140143076 A | 12/2014 |
| KR | 20150019902 A | 2/2015 |
| KR | 20150029161 A | 3/2015 |
| KR | 20150033188 A | 4/2015 |
| KR | 20150130768 A | 11/2015 |
| WO | 2013051156 A1 | 4/2013 |
| WO | 2013051157 A1 | 4/2013 |
| WO | 2013183730 A1 | 12/2013 |

OTHER PUBLICATIONS

Akyildiz et al., "Wireless Sensor Networks", Aug. 6, 2010, p. 269, John Wiley & Sons, Ltd, Chichester, UK, XP055652337.

Extended European Search Report for Application No. EP18827820 dated Jan. 10, 2020.

* cited by examiner

| Reference signal strength | Candidate ID | Location information |
|---|---|---|
| −20dBm | ID$_{can1}$ | L1 |
| −30dBm | ID$_{can2}$ | L2 |
| −40dBm | ID$_{can3}$ | L3 |

| | Reference signal strength | Reference transmission power | Candidate ID | Location information |
|---|---|---|---|---|
| 510 | -20dBm | 4dBm | $ID_{can1}$ | L1 |
| 520 | -30dBm | 5dBm | $ID_{can2}$ | L2 |
| 530 | -40dBm | 6dBm | $ID_{can3}$ | L3 |

| | Reference signal strength | Auxiliary signal strength | Candidate ID | Location information |
|---|---|---|---|---|
| 610 | -20dBm | -21dBm | $ID_{can1}$ | L1 |
| 620 | -30dBm | -32dBm | $ID_{can2}$ | L2 |
| 630 | -40dBm | -43dBm | $ID_{can3}$ | L3 |

600

WIRELESS BATTERY MANAGEMENT SYSTEM AND BATTERY PACK INCLUDING SAME

CROSS-REFERENCE TO RELATED APPLICATIONS

The present application is a national phase entry under 35 U.S.C. § 371 of International Application No. PCT/KR2018/006718 filed Jun. 14, 2018, published in Korean, which claims priority from KR10-2017-0085998 filed Jul. 6, 2017, all of which are incorporatedherein by reference.

TECHNICAL FIELD

The present disclosure relates to a wireless battery management system for individually allocating formal IDs to a plurality of slave BMSs wirelessly and a battery pack including the same.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries are gaining attention due to advantages of charging and discharging freely in the absence of a memory effect, a very low self-discharge rate, and high energy density as compared to nickel-based secondary batteries.

A battery pack applied to electric vehicles generally includes a plurality of battery modules connected in series and a plurality of battery management systems (BMSs). Each BMS monitors and controls the state of the battery module each BMU manages. Recently, to meet the demand for high-capacity high-output battery packs, the number of battery modules included in a battery pack also increases. To efficiently manage the state of each battery module included in the battery pack, a multi slave structure is disclosed. The multi slave structure includes a plurality of slave BMSs installed in each battery module and a master BMS that controls the overall operation of the plurality of slave BMSs.

In the battery pack with multi slave structure, the master BMS collects state information of the plurality of battery modules from the plurality of slave BMSs, and each slave BMS needs to be allocated with an ID indicating the physical or electrical location of the battery module managed by each slave BMS to transmit a control command for the plurality of battery modules to the plurality of slave BMSs.

Korean Patent Publication No. 10-2011-0013747 (published Feb. 10, 2011) discloses allocating IDs to a plurality of slave BMSs in a sequential order. The publication proposes a method for allocating an ID by a master BMS wiredly connected to each slave BMS. However, the ID allocation method according to the publication is performed by the master BMS on the premise of wired connection between each slave BMS, so there is a risk of wire disconnection and a great spatial limitation, and it is essential to measure and compare a potential difference by batteries that are managed by each slave BMS in advance.

DISCLOSURE

Technical Problem

The present disclosure is designed to solve the above-described problem, and therefore the present disclosure is directed to providing a wireless battery management system for wirelessly allocating IDs to a plurality of slave BMSs in a multi slave structure and a battery pack including the same.

These and other objects and advantages of the present disclosure will be understood by the following description and will be apparent from the embodiments of the present disclosure. Further, it will be readily understood that the objects and advantages of the present disclosure can be realized by the means set forth in the appended claims and combinations thereof.

Technical Solution

Various embodiments of the present disclosure for achieving the above-described object are as follows.

A wireless battery management system according to an aspect of the present disclosure includes a plurality of slave BMSs coupled to a plurality of battery modules in one-to-one correspondence, wherein each slave BMS includes a slave antenna, and a master BMS including a first master antenna, and configured to wirelessly transmit a trigger signal to each of the plurality of slave BMSs, wherein the trigger signal for ID allocation to the plurality of slave BMSs. Each slave BMS is configured to generate a response signal including a temporary ID allocated to itself in response to the trigger signal wherein each slave BMS has a different temporary ID, and wirelessly transmit the response signal to the master BMS. The master BMS is configured to receive the response signal from each of the plurality of slave BMSs through the first master antenna, and determine formal IDs to be allocated to each slave BMS wherein each slave BMS is allocated a different formal ID, and wherein the formal ID for each given slave BMS is based on a received signal strength of the response signal from the given slave BMS received through the first master antenna.

The master BMS may generate a plurality of allocation signals, each allocation signal including a different determined formal ID, and wirelessly transmit the plurality of allocation signals to the plurality of slave BMSs in one-to-one correspondence.

Each given slave BMS may replace its temporary ID with the formal ID included in the allocation signal transmitted to the given slave BMS.

Each slave BMS may further include a slave memory in which preset transmission power information and the allocated temporary ID are stored, a slave communication unit configured to transmit the response signal and receive the trigger signal using the slave antenna, and a slave control unit configured to generate the response signal including the temporary ID when receiving the trigger signal, and supply the slave antenna with transmission power corresponding to the preset transmission power information to wirelessly transmit the response signal to the master BMS. The slave communication unit may transmit the response signal through the slave antenna using the transmission power supplied to the slave antenna.

The master BMS may include a master memory in which an ID allocation table is stored—the ID allocation table including a plurality of reference signal strengths preset to the plurality of slave BMSs; and a plurality of candidate IDs mapped to the plurality of reference signal strengths in one-to-one correspondence, a master communication unit configured to transmit the trigger signal, and receive the response signal from each of the plurality of slave BMSs using the first master antenna, and a master control unit configured to measure the received signal strength of each of the response signals received from the plurality of slave BMSs through the first master antenna, and for each one of the plurality of candidate IDs, designate the candidate ID as a formal ID to be allocated to a given slave BMS based on a difference between the received signal strength of the response signal from the given slave BMS and each of the reference signal strengths included in the ID allocation table.

The response signal may further include the transmission power information. The ID allocation table may further include a plurality of reference transmission power information mapped to the plurality of reference signal strengths in one-to-one correspondence.

The master BMS may determine the formal ID to allocate to each slave BMS further based on the transmission power information.

When two or more reference signal strengths included in the ID allocation table have a difference that is less than a threshold from the first received signal strength of a received response signal, the master BMS may select one reference transmission power information having a smallest difference from the transmission power information among two or more reference transmission power information mapped to the two or more reference signal strengths, and determine the candidate ID mapped to the selected reference transmission power information as the formal IDs to be allocated to each slave BMS.

The master BMS may further include a second master antenna disposed at a location that is different from a location where the first master antenna is disposed.

The master BMS may receive the response signal from each of the plurality of slave BMSs through the second master antenna, and determine the formal IDs to allocate to each of the slave BMSs further based on the received signal strength of the respective response signals received through the second master antenna.

Advantageous Effects

According to at least one of the embodiments of the present disclosure, it is possible to wirelessly allocate IDs to a plurality of slave BMSs. Accordingly, as compared to conventional ID allocation technologies using cables, there is no cable disconnection risk and spatial utilization may be increased.

Additionally, according to at least one of the embodiments of the present disclosure, IDs to be allocated to each slave BMS may be determined based on the received signal strength of signals wirelessly transmitted from each slave BMS. Accordingly, it is possible to eliminate the need for the process of measuring and comparing a potential difference by batteries like what is described in Korean Patent Publication No. 10-2011-0013747, thereby improving the ID allocation efficiency.

The effects of the present disclosure are not limited to the above-mentioned effects, and other effects not mentioned herein will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus, the present disclosure should not be construed as being limited to the drawings.

FIG. 4 illustrates an ID allocation table used for a master BMS to allocate different formal IDs to each of a plurality of slave BMSs according to an embodiment of the present disclosure.

FIG. 5 illustrates an ID allocation table used for a master BMS to allocate different formal IDs to each of a plurality of slave BMSs according to another embodiment of the present disclosure.

FIG. 6 illustrates an ID allocation table used for a master BMS to allocate different formal IDs to each of a plurality of slave BMSs according to still another embodiment of the present disclosure.

MODE FOR CARRYING OUT THE INVENTION

Figure 1:
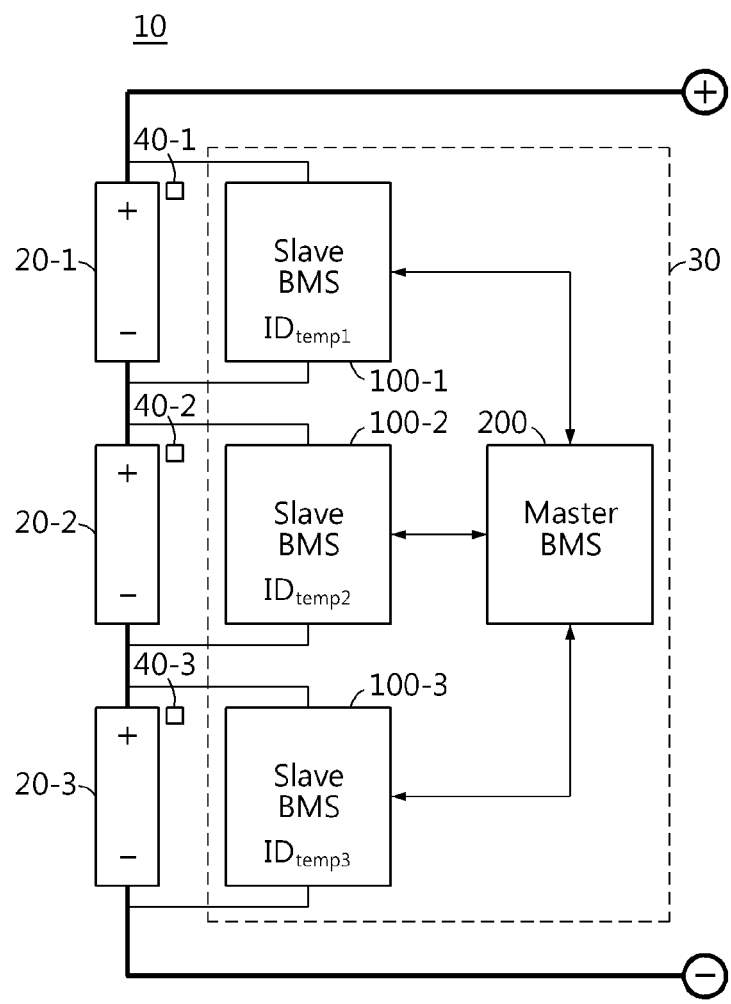
FIG. 1 is a schematic diagram showing configuration of a wireless battery management system according to an embodiment of the present disclosure and a battery pack including the same.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

It should be noted that "BMS" as used herein is a shorted form of Battery Management System.

FIG. 1 is a schematic diagram showing configuration of a wireless battery management system 30 according to an embodiment of the present disclosure and a battery pack 10 including the same.

Referring to FIG. 1, the battery pack 10 includes a plurality of battery modules 20 and a wireless battery management system 30. The wireless battery management system 30 includes a plurality of slave BMSs 100 and at least one master BMS 200.

Hereinafter, for convenience of description, assume that the battery pack 10 includes three battery modules 20-1~20-3, and the wireless battery management system 30 includes three slave BMSs 100-1~100-3 and a single master BMS 200. However, the scope of the present disclosure is not limited thereto. For example, the battery pack 10 may include only two battery modules 20 or four or more battery modules 20. Of course, the wireless battery management system 30 may include two slave BMSs 100 or four or more slave BMSs 100, and may include two or more master BMSs 200.

The plurality of slave BMSs 100-1~100-3 is coupled to plurality of battery modules 20-1~20-3 included in the battery pack 10 in one-to-one correspondence.

Each of the plurality of slave BMSs 100-1~100-3 is electrically connected to one of the plurality of battery modules 20-1~20-3 in which each of the plurality of slave BMSs 100-1~100-3 is coupled. Each of the plurality of slave BMSs 100-1~100-3 detects the overall state (for example, voltage, current, temperature) of the battery module 20 electrically connected to each of the plurality of slave BMSs 100-1~100-3, and performs a variety of control functions (for example, charging, discharging, balancing) to adjust the state of the battery module 20. Each control function may be performed directly by each slave BMS 100 based on the state of the battery module 20, or may be performed according to the command from the master BMS 200.

Figure 2:
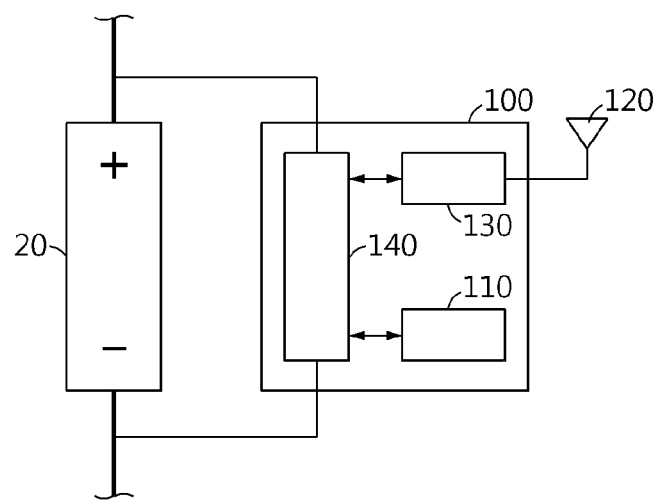
FIG. 2 is a schematic diagram showing configuration of a slave BMS shown in FIG. 1.

FIG. 2 is a schematic diagram showing configuration of the slave BMS 100 shown in FIG. 1.

Referring to FIG. 2, each of the plurality of slave BMSs 100-1~100-3 may include a slave memory 110, a slave antenna 120, a slave communication unit 130 and a slave control unit 140.

The slave memory 110 has a temporary ID stored therein. The temporary ID is allocated in the manufacture of the slave BMS 100 including the slave memory 110. The temporary ID may be used for each of the plurality of slave BMSs 100-1~100-3 to perform wireless communication with the master BMS 200 until formal IDs as described below are allocated to each of the plurality of slave BMSs 100-1~100-3. In this instance, the temporary ID allocated to one of the plurality of slave BMSs 100-1~100-3 may be different from the temporary ID allocated to the other slave BMS. Each temporary ID may be used for the master BMS 200 to distinguish each slave BMS 100 from the other slave BMS 100 before formal IDs are allocated to the slave BMSs 100. However, each temporary ID does not represent which of the plurality of battery modules 20-1~20-3 at which the slave BMS 100 with the allocated temporary ID is installed. Accordingly, only after each temporary ID is replaced with a formal ID as described below, the master BMS 200 can determine where each slave BMS 100 is coupled to among the plurality of battery modules 20-1~20-3, and perform control accordingly.

The slave memory 110 may have preset transmission power information stored therein. The transmission power information is information representing power to be supplied to the slave antenna 120 (i.e., transmission power of the slave antenna 120) during the process of formal ID allocation initiated by the master BMS 200. The transmission power information may be stored in the manufacture of the slave memory 110.

Alternatively, the transmission power information may be collected by the slave communication unit 130 via near-field wireless communication from tags installed at each location at which each slave BMS 100 will be mounted in the battery pack 10, and then may be stored in the slave memory 110. To this end, first to third tags 40-1~40-3 may be installed in first to third parts of the battery pack 10 in which the first to third slave BMSs 100-1~100-3 are mounted. The first tag 40-1 may contain a record of first transmission power information (for example, 4 dBm), the second tag 40-2 may contain a record of second transmission power information (for example, 5 dBm), and the third tag 40-3 may contain a record of third transmission power information (for example, 6 dBm).

The transmission power information preset to one of the plurality of slave BMSs 100-1~100-3 may be different from the transmission power information preset to at least one of the other slave BMSs.

The slave memory 110 is not limited to a particular type and includes any known information storage means capable of recording, deleting, updating and reading data. For example, the slave memory 110 may be DRAM, SDRAM, flash memory, ROM, EEPROM and a register. The slave memory 110 may store program codes defining the processes that can be executed by the slave control unit 140.

The slave memory 110 may be physically separated from the slave control unit 140, or may be integrated into a chip with the slave control unit 140.

The slave antenna 120 and the slave communication unit 130 are operably connected to each other. The slave communication unit 130 includes a wireless circuit to demodulate a wireless signal received by the slave antenna 120. Additionally, the slave communication unit 130 may modulate a signal to be transmitted to the master BMS 200 through the slave antenna 120 and provide it to the slave antenna 120. The slave antenna 120 may transmit a wireless signal corresponding to the signal modulated by the slave communication unit 130 to the master BMS 200.

Additionally, the wireless circuit of the slave communication unit 130 may include a RFID reader to wirelessly collect the transmission power information from one of the tags 40-1~40-3 installed in the battery pack 10.

The slave control unit 140 includes at least one processor, and is operably connected to the slave memory 110 and the slave communication unit 130. The slave control unit 140 is configured to manage the overall operation of the slave BMS 100 including the slave control unit 140.

The slave control unit 140 may include a sensing unit configured to detect the state of the battery module 20. For example, the sensing unit may include a voltage measurement circuit to detect the voltage of the battery module 20, a current measurement circuit to detect the current of the battery module 20, or a temperature detection circuit to detect the temperature of the battery module 20. The slave control unit 140 provides sensing information representing the detected state of the battery module 20 to the slave communication unit 130. Accordingly, the slave communication unit 130 transmits the wireless signal corresponding to the sensing information to the master BMS 200 through the slave antenna 120.

The slave control unit 140 may further include a power circuit. The power circuit generates at least one power source voltage using electrical energy supplied from the battery module 20 in which the slave BMS 100 is installed. The power source voltage generated by the power circuit may be supplied to the slave memory 110, the slave antenna 120 and the slave communication unit 130. Additionally, the power source voltage generated by the power circuit may be supplied to each processor included in the slave control unit 140.

Each processor included in the slave control unit 140 may selectively include a processor, an application-specific integrated circuit (ASIC), a chipset, a logic circuit, a register, a communication modem and a data processing device known in the art to execute various control logics. At least one of the various control logics of the slave control unit 140 may be combined, and the combined control logics may be written in computer-readable code system and recorded in computer-readable recording media. The recording media is not limited to a particular type and includes any type that can be accessed by a processor included in a computer. For example, the recording media includes at least one selected from the group consisting of ROM, RAM, a register, CD-ROM, a magnetic tape, a hard disk, a floppy disk and an optical data recording device. Additionally, the code system may be modulated to a carrier signal and included in a communication carrier at a particular point in time and may be stored and executed in computers connected via a network in distributed manner Additionally, functional programs, codes and code segments for implementing the combined control logics may be readily inferred by programmers in the technical field to which the present disclosure belongs.

Figure 3:
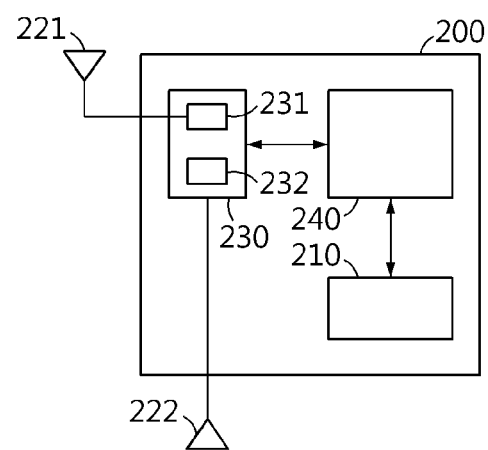
FIG. 3 is a schematic diagram showing configuration of a master BMS shown in FIG. 1.

FIG. 3 is a schematic diagram showing configuration of the master BMS 200 shown in FIG. 1.

Referring to FIG. 3, the master BMS 200 may include a master memory 210, a first master antenna 221, a master communication unit 230 and a master control unit 240. Additionally, the master BMS 200 may, optionally, further include a second master antenna 222. The second master antenna 222 may be disposed at a location that is different from a location where the first master antenna 221 is disposed.

The master memory 210 stores an ID allocation table. The ID allocation table includes a plurality of reference signal strengths and a plurality of candidate IDs. The plurality of reference signal strengths are preset for the plurality of slave BMSs 100-1~100-3. Additionally, the plurality of candidate IDs is mapped to the plurality of reference signal strengths in one-to-one correspondence. According to an implementation embodiment, the ID allocation table may further include a plurality of location information. Similar to the plurality of candidate IDs, the plurality of location information is mapped to the plurality of reference signal strengths in one-to-one correspondence. This means that the plurality of location information is mapped to the plurality of candidate IDs in one-to-one correspondence.

Each of the plurality of location information is information representing a location in the battery pack 10 at which the battery module 20 is disposed, in which each of the plurality of slave BMSs 100-1~100-3 is installed. However, the master BMS 200 cannot determine which of the plurality of location information corresponds to each of the plurality of slave BMSs 100-1~100-3 until formal IDs are allocated to the plurality of slave BMSs 100-1~100-3.

The master memory 210 is not limited to a particular type and includes any known information storage means capable of recording, deleting, updating and reading data. For example, the master memory 210 may be DRAM, SDRAM, flash memory, ROM, EEPROM and a register. The master memory 210 may store program codes defining the processes that can be executed by the slave control unit 140.

The master memory 210 may be physically separated from the master control unit 240, and may be integrated into a chip with the master control unit 240.

The first master antenna 221 and the master communication unit 230 are operably connected to each other. The master communication unit 230 includes a wireless circuit 231 to demodulate the wireless signal received by the first master antenna 221. The master communication unit 230 may further include a wireless circuit 232 to demodulate a wireless signal received by the second master antenna 222. Additionally, the master communication unit 230 may modulate a signal to transmit to the slave BMS 100, and transmit the modulated signal wirelessly through at least one of the first master antenna 221 and the second master antenna 222. At least one of the first master antenna 221 and the second master antenna 222 may selectively transmit the wireless signal corresponding to the signal modulated by the master communication unit 230 to at least one of the plurality of slave BMSs 100-1~100-3.

The master control unit 240 may further include a power circuit. The power circuit of the master control unit 240 generates at least one power source voltage using electrical energy supplied from the battery module 20, an external power source or its own power source. The power source voltage generated by the power circuit of the master control unit 240 may be supplied to the master memory 210, the master antennas 221, 222 and the master communication unit 230. Additionally, the power source voltage generated by the power circuit of the master control unit 240 may be supplied to each processor included in the master control unit 240.

The master control unit 240 includes at least one processor, and is operably connected to the master memory 210 and the master communication unit 230. The master control unit 240 is configured to manage the overall operation of the master BMS 200. Additionally, the master control unit 240 may calculate the State Of Charge (SOC) and/or State Of Health (SOH) of each of the plurality of battery modules 20-1~20-3 based on the wireless signals corresponding to sensing information of each of the plurality of slave BMSs 100-1~100-3 among the wireless signals received through at least one of the first master antenna 221 and the second master antenna 222. Additionally, the master control unit 240 may generate information for controlling the charging, discharging and/or balancing of each of the plurality of slave BMSs 100-1~100-3 based on the calculated SOC and/or SOH, and selectively transmit it to at least one of the plurality of slave BMSs 100-1~100-3 through at least one of at least one of the first master antenna 221 and the second master antenna 222, and the master communication unit 230.

Each processor included in the master control unit 240 may selectively include a processor, an application-specific integrated circuit (ASIC), a chipset, a logic circuit, a register, a communication modem and a data processing device known in the art to execute various control logics. At least one of the various control logics of the master control unit 240 may be combined, and the combined control logics may be written in computer-readable code system and recorded in computer-readable recording media. The recording media is not limited to a particular type when it can be accessed by a processor included in a computer. For example, the recording media includes at least one selected from the group consisting of ROM, RAM, a register, CD-ROM, a magnetic tape, a hard disk, a floppy disk and an optical data recording device. Additionally, the code system may be modulated to a carrier signal and included in a communication carrier at a particular point in time and may be stored and executed in computers connected via a network in distributed manner Additionally, functional programs, codes and code segments for implementing the combined control logics may be readily inferred by programmers in the technical field to which the present disclosure belongs.

Hereinafter, each of Method#1, Method#2 and Method#3 for allocating different formal IDs to the plurality of slave BMSs 100-1~100-3 of the wireless battery management system 30 will be described in detail.

<Method#1 for allocating different formal IDs to the plurality of slave BMSs 100-1~100-3>

FIG. 4 illustrates an ID allocation table used for the master BMS 200 to allocate different formal IDs to each of the plurality of slave BMSs 100 according to an embodiment of the present disclosure.

Referring to FIG. 4, the ID allocation table 400 includes a plurality of data arrays 410, 420, 430. The number of data arrays may be the same as the number of slave BMSs 100. Because three slave BMSs 100 were assumed in the foregoing, the number of data arrays included in the ID allocation table is shown as three.

Each data array basically includes one reference signal strength and one candidate ID. Optionally, each data array may further include one location information.

The reference signal strength, the candidate ID and the location information included in common data array are mapped in one-to-one correspondence. For reference, assume that the unit of the reference signal strength is decibels above 1 milliwatt (dBm).

In the ID allocation table 400, the first reference signal strength (−20 dBm) of the first data array 410 is mapped to the first candidate ID $ID_{can1}$ and the first location information L1, the second reference signal strength (−30 dBm) of the second data array 420 is mapped to the second candidate ID $ID_{can2}$ and the second location information L2, and the third reference signal strength (−40 dBm) of the third data array 430 is mapped to the third candidate ID $ID_{can3}$ and the third location information L3. For example, the first location information L1 may represent the location at which the first battery module 20-1 or the first tag 40-1 is disposed, the second location information L2 may represent the location at which the second battery module 20-2 or the second tag 40-2 is disposed, and the third location information L3 may represent the location at which the third battery module 20-3 or the third tag 40-3 is disposed.

The master BMS 200 including the master memory 210 in which the above exemplified ID allocation table is stored initiates the operation for allocating one of the first to third candidate IDs to each of the first to third slave BMSs 100-1~100-3 as a formal ID.

Specifically, the master control unit 240 outputs an initiation signal commanding formal ID allocation to the master communication unit 230. Then, the master communication unit 230 modulates the initiation signal to generate a wireless trigger signal. The trigger signal is transmitted to the first to third slave BMSs 100-1~100-3 through the first master antenna 221.

The slave antennas 120 of each of the first to third slave BMSs 100-1~100-3 receive the trigger signal from the master BMS 200, and provide the received trigger signal to the slave control unit 140 through the slave communication unit 130.

The slave control unit 140 of the first slave BMS 100-1 generates a first response signal in response to the trigger signal. The first response signal generated by the slave control unit 140 of the first slave BMS 100-1 includes the first temporary ID $ID_{temp1}$ allocated to the first slave BMS 100-1.

The slave control unit 140 of the second slave BMS 100-2 generates a second response signal in response to the trigger signal. The second response signal generated by the slave control unit 140 of the second slave BMS 100-2 includes the second temporary ID $ID_{temp2}$ allocated to the second slave BMS 100-2.

The slave control unit 140 of the third slave BMS 100-3 generates a third response signal in response to the trigger signal. The third response signal generated by the slave control unit 140 of the third slave BMS 100-3 includes the third temporary ID $ID_{temp3}$ allocated to the third slave BMS 100-3.

The first to third temporary IDs may have distinguishable data formats.

The slave antenna 120 of the first slave BMS 100-1 wirelessly transmits the first response signal including the first temporary ID using the first transmission power supplied by the slave control unit 140 of the first slave BMS 100-1. Additionally, the slave antenna 120 of the second slave BMS 100-2 wirelessly transmits the second response signal including the second temporary ID using the second transmission power supplied by the slave control unit 140 of the second slave BMS 100-2. Additionally, the slave antenna 120 of the third slave BMS 100-3 wirelessly transmits the third response signal including the third temporary ID using the third transmission power supplied by the slave control unit 140 of the third slave BMS 100-3.

Each of the first to third transmission power may correspond to the first to third transmission power information that is preset to be supplied to the slave antennas 120 of each of the first to third slave BMSs 100-1~100-3 while the first to third response signals are being wirelessly transmitted. For example, the first transmission power information may be stored in the slave memory 110 of the first slave BMS 100-1, the second transmission power information may be stored in the slave memory 110 of the second slave BMS 100-2, and the third transmission power information may be stored in the slave memory 110 of the third slave BMS 100-3.

The first to third response signals by the first to third slave BMSs 100-1~100-3 are wirelessly transmitted to the master BMS 200 simultaneously or sequentially. For example, when the trigger signal is simultaneously transmitted to the first to third slave BMSs 100-1~100-3, the first slave BMS 100-1 may wirelessly transmit the first response signal including the first temporary ID at the point in time when a first delay time corresponding to the first temporary ID has elapsed from the point in time the trigger signal is received, the second slave BMS 100-2 may wirelessly transmit the second response signal including the second temporary ID at the point in time when a second delay time corresponding to the second temporary ID has elapsed from the point in time the trigger signal is received, and the third slave BMS 100-3 may wirelessly transmit the third response signal including the third temporary ID at the point in time when a third delay time corresponding to the third temporary ID has elapsed from the point in time the trigger signal is received. Accordingly, it is possible to suppress a signal interference phenomenon that may occur when the plurality of response signals is transmitted to the master BMS 200 at once.

The master BMS 200 receives the first to third response signals transmitted simultaneously or sequentially from each of the first to third slave BMSs 100-1~100-3 through at least one of the first master antenna 221 and the second master antenna 222. As described above, each of the first to third response signals includes the first to third temporary IDs that are different from one another. Accordingly, the master control unit 240 may identify the first to third response signals based on the first to third temporary IDs.

Subsequently, the master control unit 240 measures the received signal strengths of each of the first to third response signals. The received signal strength may be also called 'RSSI', a shorted form of Received Signal Strength Indication.

Provided the received signal strengths of the first to third response signals received through the first master antenna 221 are measured to be −21 dBm, −29 dBm and −42 dBm respectively.

The master control unit 240 may calculate differences between the received signal strengths of each of the first to third response signals and the first to third reference signal strengths included in the ID allocation table 400. For example, the received signal strength (−21 dBm) of the first response signal has a difference of −1 dBm from the first reference signal strength, a difference of 9 dBm from the second reference signal strength, and a difference of 19 dBm from the third reference signal strength.

Additionally, the received signal strength (−29 dBm) of the second response signal has a difference of −9 dBm from the first reference signal strength, a difference of 1 dBm from the second reference signal strength, and a difference of 11 dBm from the third reference signal strength.

Additionally, the received signal strength (−42 dBm) of the third response signal has a difference of −22 dBm from the first reference signal strength, a difference of −12 dBm from the second reference signal strength, and a difference of −2 dBm from the third reference signal strength.

Subsequently, the master control unit 240 may select the first to third candidate IDs one by one based on the differences between the received signal strengths of each of the first to third response signals and the first to third reference signal strengths included in the ID allocation table.

For example, the absolute values of differences between the received signal strength of the first response signal and the first to third reference signal strengths are 1 dBm, 9 dBm and 19 dBm, and among them, 1 dBm is only one that is smaller than a predetermined threshold (for example, 6 dBm). In this case, the master control unit 240 may determine the first candidate ID $ID_{can1}$ mapped to the first reference signal strength as a first formal ID to be allocated to the first slave BMS 100-1.

Additionally, the absolute values of differences between the received signal strength of the second response signal and the first to third reference signal strengths are 9 dBm, 1 dBm and 11 dBm, and among them, 1 dBm is only one that is smaller than the predetermined threshold (for example, 6 dBm). In this case, the master control unit 240 may determine the second candidate ID $ID_{can2}$ mapped to the second reference signal strength as a second formal ID to be allocated to the second slave BMS 100-2.

Additionally, the absolute values of differences between the received signal strength of the third response signal and the first to third reference signal strengths are 22 dBm, 12 dBm and 2 dBm, and among them, 2 dBm is only one that is smaller than the predetermined threshold (for example, 6 dBm). In this case, the master control unit 240 may determine the third candidate ID $ID_{can3}$ mapped to the third reference signal strength as a third formal ID to be allocated to the third slave BMS 100-3.

When determination of formal IDs to be allocated to all the slave BMSs 100-1~100-3 in the wireless battery management system 30 is completed, the master BMS 200 generates first to third allocation signals including the formal IDs determined for each of the first to third slave BMSs 100-1~100-3. The first to third allocation signals may further include the temporary IDs of each of the first to third slave BMSs 100-1~100-3. For example, the first allocation signal includes the first temporary ID $ID_{temp1}$ and the first formal ID $ID_{can1}$, the second allocation signal includes the second temporary ID $ID_{temp2}$ and the second formal ID $ID_{can2}$, and the third allocation signal includes the third temporary ID $ID_{temp3}$ and the third formal ID $ID_{can3}$.

The master BMS 200 transmits each of the first to third allocation signals wirelessly to the first to third slave BMSs 100-1~100-3 simultaneously or sequentially. Each of the first to third slave BMSs 100-1~100-3 may store, in its own slave memory 110, only one allocation signal including the same temporary ID as the temporary ID allocated to each of the first to third slave BMSs 100-1~100-3 among the first to third allocation signals.

For example, the first slave BMS 100-1 stores the first formal ID $ID_{can1}$ included in the first allocation signal including the first temporary ID $ID_{temp1}$ among the first to third allocation signals in the slave memory 110 of the first slave BMS 100-1. The first slave BMS 100-1 may replace the first temporary ID $ID_{temp1}$ stored in the slave memory 110 of the first slave BMS 100-1 with the first formal ID $ID_{can1}$.

Additionally, the second slave BMS 100-2 stores the second formal ID $ID_{can2}$ included in the second allocation signal including the second temporary ID $ID_{temp2}$ among the first to third allocation signals in the slave memory 110 of the second slave BMS 100-2. The second slave BMS 100-2 may replace the second temporary ID $ID_{temp2}$ stored in the slave memory 110 of the second slave BMS 100-2 with the second formal ID $ID_{can2}$.

Additionally, the third slave BMS 100-3 stores the third formal ID IDcan3 included in the third allocation signal including the third temporary ID $ID_{temp3}$ among the first to third allocation signals in the slave memory 110 of the third slave BMS 100-3. The third slave BMS 100-3 may replace the third temporary ID $ID_{temp3}$ stored in the slave memory 110 of the third slave BMS 100-3 with the third formal ID $ID_{can3}$.

Method#1 described above with reference to FIG. 4 may be applied to a situation in which one of the first to third reference signal strengths has a difference that is less than the threshold from the received signal strength of each response signal. However, there is a limitation in applying to a situation in which two or more of the first to third reference signal strengths have a difference that is less than the threshold from the received signal strength of each response signal.

Dissimilar to the previous example described above, when the received signal strength of the first response signal transmitted by the first slave BMS 100-1 is measured to be −25 dBm, the absolute value of difference of 5 dBm between the received signal strength of the first response signal and the first reference signal strength of −20 dBm is smaller than the threshold (for example, 6 dBm), and the absolute value of difference of 5 dBm between the received signal strength of the first response signal and the second reference signal strength of −30 dBm is also smaller than the threshold (for example, 6 dBm). Accordingly, the master BMS 200 cannot properly determine which of the first and second candidate IDs is to be allocated to the first slave BMS 100-1 as a formal ID.

Hereinafter, Method#2 and Method#3 in a modified form of Method#1 to solve this problem will be described. In summary, Method#2 determines formal IDs to be allocated to each slave BMS 100 further based on the transmission power information included in the response signals from each slave BMS 100. Additionally, Method#3 determines formal IDs to be allocated to each slave BMS 100 further based on the received signal strength of the response signal received through the second master antenna 222.

<Method#2 for allocating different formal IDs to the plurality of slave BMSs 100-1~100-3>

FIG. 5 illustrates an ID allocation table used for the master BMS 200 to allocate different formal IDs to each of the plurality of slave BMSs 100 according to another embodiment of the present disclosure.

Referring to FIG. 5, dissimilar to the ID allocation table 400 of FIG. 4, each data array of the ID allocation table 500 basically includes one reference signal strength and one candidate ID, and further includes one reference transmission power information. The plurality of reference transmission power information included in the ID allocation table is mapped to the plurality of reference signal strengths one-to-one. That is, the reference signal strength, the reference transmission power information, the candidate ID and the location information included in common data array are mapped in one-to-one correspondence.

In the ID allocation table 500, the first reference signal strength (−20 dBm) of the first data array 510 is mapped to the first reference transmission power information (4 dBm), the first candidate ID $ID_{can1}$ and the first location information L1, the second reference signal strength (−30 dBm) of the second data array 520 is mapped to the second reference transmission power information (5 dBm), the second candidate ID $ID_{can2}$ and the second location information L2, and the third reference signal strength (−40 dBm) of the third data array 530 is mapped to the third reference transmission power information (6 dBm), the third candidate ID $ID_{can3}$ and the third location information L3.

Similar to Method#1 described above with reference to FIG. 4, the slave control unit 140 of the first slave BMS 100-1 generates a first response signal in response to the trigger signal. The first response signal generated by the slave control unit 140 of the first slave BMS 100-1 includes the first reference transmission power information (4 dBm) together with the first temporary ID $ID_{temp1}$ allocated to the first slave BMS 100-1.

The slave control unit 140 of the second slave BMS 100-2 generates a second response signal in response to the trigger signal. The second response signal generated by the slave control unit 140 of the second slave BMS 100-2 includes the second reference transmission power information (5 dBm) together with the second temporary ID $ID_{temp2}$ allocated to the second slave BMS 100-2.

The slave control unit 140 of the third slave BMS 100-3 generates a third response signal in response to the trigger signal. The third response signal generated by the slave control unit 140 of the third slave BMS 100-3 includes the third reference transmission power information (6 dBm) together with the third temporary ID $ID_{temp3}$ allocated to the third slave BMS 100-3.

Assume that the received signal strengths of the first to third response signals received through the first master antenna 221 are measured to be −24.5 dBm, −25.5 dBm and −35.5 dBm respectively.

In this case, the absolute values of differences between the received signal strength of the first response signal and the first to third reference signal strengths are 4.5 dBm, 5.5 dBm and 15.5 dBm, and among them, 4.5 dBm and 5.5 dBm are smaller than the predetermined threshold (for example, 6 dBm). That is, among the first to third reference signal strengths, the first and second reference signal strengths have the absolute value of difference that is smaller than the predetermined threshold (for example, 6 dBm) from the received signal strength of the first response signal.

Additionally, the absolute values of differences between the received signal strength of the second response signal and the first to third reference signal strengths are 5.5 dBm, 4.5 dBm and 14.5 dBm, and among them, 5.5 dBm and 4.5 dBm are smaller than the predetermined threshold (for example, 6 dBm). That is, among the first to third reference signal strengths, the first and second reference signal strengths have the absolute value of difference that is smaller than the predetermined threshold (for example, 6 dBm) from the received signal strength of the second response signal.

Additionally, the absolute values of differences between the received signal strength of the third response signal and the first to third reference signal strengths are 15.5 dBm, 5.5 dBm and 4.5 dBm, and among them, 5.5 dBm and 4.5 dBm are smaller than the predetermined threshold (for example, 6 dBm). That is, among the first to third reference signal strengths, the second and third reference signal strengths have the absolute value of difference that is smaller than the predetermined threshold (for example, 6 dBm) from the received signal strength of the third response signal.

When two or more of the plurality of reference signal strengths included in the ID allocation table 500 have the difference that is less than the threshold from each received signal strength, the master control unit 240 may determine one reference transmission power information having the smallest difference from transmission power information among two or more reference transmission power information mapped to the two or more reference signal strengths.

The master BMS 200 selects the first reference transmission information 4 dBm having the smallest difference from the first transmission power information among the first and second reference transmission power information mapped respectively to the first and second reference signal strength having the difference that is less than the threshold from the received signal strength −24.5 dBm of the first response signal. Subsequently, the master BMS 200 may determine the first candidate ID $ID_{can1}$ mapped to the selected first reference transmission information as a first formal ID to be allocated to the first slave BMS 100-1.

Additionally, the master BMS 200 selects the second reference transmission information 5 dBm having the smallest difference from the second transmission power information among the first and second reference transmission power information mapped respectively to the first and second reference signal strengths having the difference that is less than the threshold from the received signal strength −25.5 dBm of the second response signal. Subsequently, the master BMS 200 may determine the second candidate ID $ID_{can2}$ mapped to the selected second reference transmission information as a second formal ID to be allocated to the second slave BMS 100-2.

Additionally, the master BMS 200 selects the third reference transmission information having the smallest difference from the third transmission power information 6 dBm among the second and third reference transmission power information mapped respectively to the second and third reference signal strengths having the difference that is less than the threshold from the received signal strength −35.5 dBm of the third response signal. Subsequently, the master BMS 200 may determine the third candidate ID $ID_{can3}$ mapped to the selected third reference transmission information as a third formal ID to be allocated to the third slave BMS 100-3.

<Method#3 for allocating different formal IDs to the plurality of slave BMSs 100-1~100-3>

FIG. 6 illustrates an ID allocation table used for the master BMS 200 to allocate different formal IDs to each of the plurality of slave BMSs 100 according to still another embodiment of the present disclosure.

Referring to FIG. 6, dissimilar to the ID allocation table 400 of FIG. 4 and the ID allocation table 500 of FIG. 5, each data array of the ID allocation table 600 basically includes one reference signal strength and one candidate ID, and further includes one auxiliary signal strength. The plurality of auxiliary signal strengths included in the ID allocation table 600 is mapped to the plurality of reference signal strengths one-to-one. That is, the reference signal strength, the auxiliary signal strength, the candidate ID and the location information included in common data array are mapped in one-to-one correspondence.

In the ID allocation table 600, the first reference signal strength (−20 dBm) of the first data array 610 is mapped to the first auxiliary signal strength (−21 dBm), the first candidate ID $ID_{can1}$) and the first location information L1, the second reference signal strength (−30 dBm) of the second data array 620 is mapped to the second auxiliary signal strength (−32 dBm), the second candidate ID $ID_{can2}$ and the second location information L2, and the third reference signal strength (−40 dBm) of the third data array 630 is mapped to the third auxiliary signal strength (−43 dBm), the third candidate ID $ID_{can3}$ and the third location information L3.

Similar to Method#1 described above with reference to FIG. 4, the first response signal generated by the slave control unit 140 of the first slave BMS 100-1 includes the first temporary ID $ID_{temp1}$ allocated to the first slave BMS 100-1. Additionally, the second response signal generated by the slave control unit 140 of the second slave BMS 100-2 includes the second temporary ID $ID_{temp2}$ allocated to the second slave BMS 100-2. Additionally, the third response signal generated by the slave control unit 140 of the third slave BMS 100-3 includes the third temporary ID $ID_{temp3}$ allocated to the third slave BMS 100-3.

As opposed to Method#1 and Method#2, the master BMS 200 may receive the first to third response signals through the first master antenna 221, and also receive the first to third response signals through the second master antenna 222. The master control unit 240 may further measure the received signal strengths of each of the first to third response signals received through the second master antenna 222.

Assume that the received signal strengths of the first to third response signals received through the first master antenna 221 are measured to be −24.5 dBm, −25.5 dBm and −35.5 dBm respectively, and the received signal strengths of the first to third response signals received through the second master antenna 222 are measured to be −25 dBm, −27 dBm and −38 dBm respectively.

The absolute values of differences between the received signal strength of the first response signal received through the first master antenna 221 and the first to third reference signal strengths are 4.5 dBm, 5.5 dBm and 15.5 dBm respectively, and the absolute values of differences between the received signal strength of the first response signal received through the second master antenna 222 and the first to third auxiliary signal strengths are 4 dBm, 7 dBm and 18 dBm respectively. That is, among the first to third reference signal strengths, the first and second reference signal strengths have the absolute value of difference that is smaller than the predetermined threshold (for example, 6 dBm) from the received signal strength of the first response signal received through the first master antenna 221, and among the first to third auxiliary signal strengths, the first auxiliary signal strength has the absolute value of difference that is smaller than the predetermined threshold (for example, 6 dBm) from the received signal strength of the first response signal received through the second master antenna 222. Accordingly, the master control unit 240 may determine the first candidate ID $ID_{can1}$ mapped to the first auxiliary signal strength as well among the first and second candidate IDs mapped respectively to the first and second reference signal strengths as a first formal ID to be allocated to the first slave BMS 100-1.

Additionally, the absolute values of differences between the received signal strength of the second response signal received through the first master antenna 221 and the first to third reference signal strengths are 5.5 dBm, 4.5 dBm and 14.5 dBm respectively, and the absolute values of differences between the received signal strength of the second response signal received through the second master antenna 222 and the first to third auxiliary signal strengths are 6 dBm, 5 dBm and 16 dBm respectively. That is, among the first to third reference signal strengths, the first and second reference signal strengths have the absolute value of difference that is smaller than the predetermined threshold (for example, 6 dBm) from the received signal strength of the second response signal received through the first master antenna 221, and among the first to third auxiliary signal strengths, the second auxiliary signal strength has the absolute value of difference that is smaller than the predetermined threshold (for example, 6 dBm) from the received signal strength of the second response signal received through the second master antenna 222. Accordingly, the master control unit 240 may determine the second candidate ID $ID_{can2}$ mapped to the second auxiliary signal strength as well among the first and second candidate IDs mapped respectively to the first and second reference signal strengths as a second formal ID to be allocated to the second slave BMS 100-2.

Additionally, the absolute values of differences between the received signal strength of the third response signal received through the first master antenna 221 and the first to third reference signal strengths are 15.5 dBm, 5.5 dBm and 4.5 dBm respectively, and the absolute values of differences between the received signal strength of the second response signal received through the second master antenna 222 and the first to third auxiliary signal strengths are 17 dBm, 6 dBm and 5 dBm respectively. That is, among the first to third reference signal strengths, the second and third reference signal strengths have the absolute value of difference that is smaller than the predetermined threshold (for example, 6 dBm) from the received signal strength of the third response signal received through the first master antenna 221, and among the first to third auxiliary signal strengths, the third auxiliary signal strength has the absolute value of difference that is smaller than the predetermined threshold (for example, 6 dBm) from the received signal strength of the third response signal received through the second master antenna 222. Accordingly, the master control unit 240 may determine the third candidate ID $ID_{can3}$ mapped to the third auxiliary signal strength as well among the second and third candidate IDs mapped respectively to the second and third reference signal strengths as a third formal ID to be allocated to the third slave BMS 100-3.

The numerical values of each data recorded in each of the ID allocation tables 400, 500, 600 described above are provided for illustration only, but not intended to limit the scope of the present disclosure.

Each data (for example, reference signal strength, auxiliary signal strength) recorded in each of the ID allocation tables 400, 500, 600 may be acquired through simulations or measurements in the process of designing the wireless battery management system 30.

Additionally, the master control unit 240 may correct the measured received strength using a variety of known error reduction algorithms such as Kalman filter, and compare the corrected received strength with the reference signal strength recorded in each ID allocation table. Accordingly, it is possible to reduce an error that may occur in the process of allocating the formal ID by reducing an error between the reference signal strength recorded in each ID allocation table and the actually measured received strength.

The embodiments of the present disclosure described hereinabove are not implemented only through the apparatus and method, and may be implemented through programs that realize functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

What is claimed is:

1. A wireless battery management system (BMS) comprising:
   a plurality of slave BMSs which are coupled to a plurality of battery modules in one-to-one correspondence, wherein each slave BMS of the plurality of slave BMSs includes a slave antenna; and
   a master BMS including a first master antenna, and configured to wirelessly transmit a trigger signal to each of the plurality of slave BMSs, wherein the trigger signal is for identification (ID) allocation to each slave BMS of the plurality of slave BMSs,
   wherein each slave BMS of the plurality of slave BMSs is configured to:
      generate a response signal including an allocated temporary ID in response to the trigger signal, wherein each slave BMS has a different temporary ID, and wirelessly transmit the response signal to the master BMS, and
   wherein the master BMS is configured to:
      receive the response signals from all of the plurality of slave BMSs through the first master antenna, and
      for each given slave BMS of the plurality of slave BMSs, determine a formal ID to be allocated to the given slave BMS, wherein a different formal ID is allocated to each slave BMS of the plurality of slave BMSs, and wherein the formal ID for the given slave BMS is based on a received signal strength of the response signal transmitted from the given slave BMS and received through the first master antenna.

2. The wireless BMS according to claim 1, wherein the master BMS is further configured to:
   generate a plurality of allocation signals, each allocation signal including a different determined formal ID, and
   wirelessly transmit the plurality of allocation signals to the plurality of slave BMSs in one-to-one correspondence.

3. The wireless BMS according to claim 2, wherein for each given slave BMS, the given slave BMS is further configured to replace its temporary ID with the formal ID included in the allocation signal transmitted to the given slave BMS.

4. The wireless BMS according to claim 1, wherein each slave BMS further comprises:
   a slave memory in which preset transmission power information and the allocated temporary ID are stored;
   a slave communication unit configured to:
      transmit the response signal, and
      receive the trigger signal using the slave antenna; and
   a slave control unit configured to:
      generate the response signal including the temporary ID when receiving the trigger signal, and
      supply the slave antenna with transmission power corresponding to the preset transmission power information to wirelessly transmit the response signal to the master BMS,
   wherein the slave communication unit is further configured to transmit the response signal through the slave antenna using the transmission power supplied to the slave antenna.

5. The wireless BMS according to claim 4, wherein the master BMS further comprises:
   a master memory in which an ID allocation table is stored, wherein the ID allocation table includes:
      a plurality of reference signal strengths respectively preset to the plurality of slave BMSs; and
      a plurality of candidate IDs mapped to the plurality of reference signal strengths in one-to-one correspondence;
   a master communication unit configured to:
      transmit the trigger signal to each slave BMS, and
      receive the response signals from all of the plurality of slave BMSs using the first master antenna; and
   a master control unit configured to:
      measure the respective received signal strengths of all of the response signals received from the plurality of slave BMSs through the first master antenna, and
      for each one of the plurality of candidate IDs, designate the candidate ID as a formal ID to be allocated to a corresponding slave BMS based on a difference between the received signal strength of the response signal from the given slave BMS and an associated reference signal strength included in the ID allocation table.

6. The wireless BMS according to claim 5, wherein the response signal further comprises the preset transmission power information, and the ID allocation table further comprises a plurality of reference transmission power information mapped to the plurality of reference signal strengths in one-to-one correspondence.

7. The wireless BMS according to claim 6, wherein the master BMS is further configured to determine the formal ID to allocate to each slave BMS further based on the preset transmission power information.

8. The wireless BMS according to claim 7, wherein when two or more reference signal strengths of the plurality of reference signal strengths included in the ID allocation table have a difference that is less than a threshold from the received signal strength of a received response signal, the master BMS is further configured to:

select one set of reference transmission power information having a smallest difference from the preset transmission power information from among two or more sets of reference transmission power information mapped to the two or more reference signal strengths, and determine a candidate ID mapped to the respective selected set of reference transmission power information as the formal ID to be allocated to the given slave BMS.

9. The wireless BMS according to claim 1, wherein the master BMS further comprises:

a second master antenna disposed at a location that is different from a location where the first master antenna is disposed.

10. The wireless BMS according to claim 9, wherein the master BMS is further configured to:

receive the response signals from all of the plurality of slave BMSs through the second master antenna, and for each given slave BMS, determine the formal ID to be allocated to the given slave BMS further based on the received signal strength of the response signal received from the given slave BMS through the second master antenna.

* * * * *